United States Patent Office 3,522,406
Patented Aug. 4, 1970

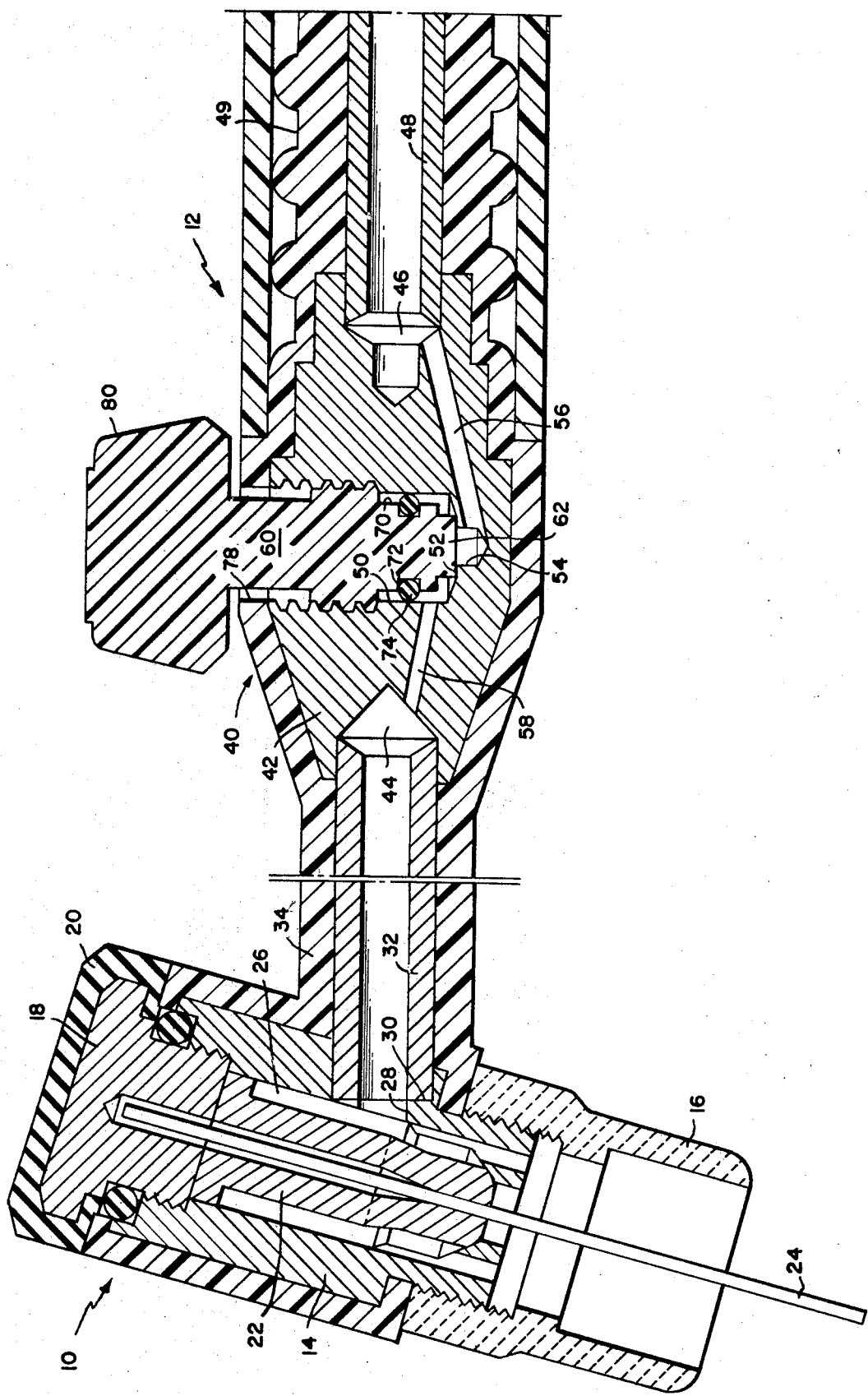

3,522,406
WELDING TORCH GAS CONTROL VALVE
John M. Sipos, Easton, and Watson R. Collins, Jr., Oreland, Pa., assignors to Air Products and Chemicals, Inc., Allentown, Pa., a corporation of Delaware
Filed Feb. 18, 1969, Ser. No. 800,083
Int. Cl. B23k *9/16; 35/38*
U.S. Cl. 219—74                      2 Claims

ABSTRACT OF THE DISCLOSURE

A control valve for the shielding gas of a welding torch in which a one-piece valve member is constructed to serve as a combined valve head, valve stem, and valve seal supporting means.

BACKGROUND OF THE INVENTION

This invention relates to the field of gas control valves for use in controlling the shielding gas of welding torches particularly of the tungsten electrode and inert gas type known in the art as a "TIG" torch.

TIG torches are well-known in the art and are conventionally provided with a torch head at one end having a barrel member containing a collet to hold the electrode in position. The prior art torches are also provided with a valve for controlling the flow of the shielding gas to the barrel member and means for connecting the torch to a supply of shielding gas. One of the problems in valves of the indicated type is that it is important to construct a shielding gas valve so as to minimize the cost of the welding torch while also achieving effective shielding gas flow control. The problem of the prior art welding torch control valves is that they develop difficulties in use because they comprise various parts which wear or malfunction.

SUMMARY OF THE INVENTION

In accordance with the invention there is provided a control valve for the shielding gas of a welding torch which comprises a one-piece valve member which functions as a combined valve head, valve stem and valve seal supporting means. Briefly stated, the invention is embodied in a welding torch comprising a handle, a torch head mounted on the handle and means for delivering shielding gas to the torch head including a control valve in accordance with the invention. The control valve includes a valve body having an inlet and an outlet, an elongated bore formed in the valve body in a counterbore provided so that the valve seat is defined between said bores. The control valve also includes an inlet passage providing communication between the inlet and the counterbore and an outlet passage providing communication between the outlet and the first bore. There is also provided valve stem and valve head providing means which is threadedly engaged in the first bore and forms a valve head at its lower end cooperable with said valve seat, this member also being provided with an annular recess adapted to receive a sealing means which cooperates with the wall of the bore in the valve body and said integral member to provide a seal therebetween.

BRIEF DESCRIPTION OF THE DRAWING

The single figure of the drawing is an enlarged longitudinal section of a TIG torch embodying the gas control valve in accordance with the present invention.

DESCRIPTION OF THE PREFERRED EMBODIMENT

The drawing discloses a welding torch embodying the control valve in accordance with the invention, this torch comprising a torch head, indicated generally at 10, and joined with a handle portion, indicated generally at 12, at an angle as is illustrated in the drawing. The torch head includes a one-piece barrel member 14, a ceramic nozzle 16 in threaded engagement with the barrel member 14, a cap 18 positioned in threaded engagement with the upper end of the barrel member 14, the cap being provided with an enlarged head which is enclosed in a suitable molded insulation indicated at 20, and a collet 22 positioned within the barrel member 14. The collet 22 is held between the lower end of the cap 18 and a conical wall formed at the lower end of the barrel member 14 and comprises four flexible arm portions the lower ends of which bear against the conical wall at the lower end of the barrel member 14. By this arrangement, in response to the movement of the cap 18 inwardly to force the collet 22 downwardly, the collet arms are cammed radially inwardly into tight gripping engagement with the tungsten electrode indicated at 24. It is in this manner that the collet 22 is used to hold the electrode 24 in a desired position for welding.

The barrel member 14 cooperates with the exterior of the collet 22 to define an annular chamber 26 within the barrel member 14 at a generally medial location thereof. The barrel member 14 is provided with a side port 28 communicating with this annular chamber 26 and with a counterbore 30 which receives and is rigidly connected to the gas and current supply tube 32. The exterior surfaces of the barrel member 14 and the tube 32 are covered with an integral molded insulating cover 34 which may be composed of a suitable insulating material. The insulating cover 34 extends over the upper peripheral edge of the barrel member 14 for sealing contact with an opposing portion of the insulating cover 20 for the cap 18.

The shielding gas is supplied to the tube 32 by way of a control valve indicated generally at 40. The control valve 40 comprises a valve body 42 having an outlet port 44 formed in the end thereof facing the torch head 10 and adapted to receive the end of the tube 32. The other end of the valve body 42 is provided with an inlet port 46 which is adapted to receive a gas supply tube 48. The insulation material 34 which encloses the barrel member 14 also encloses the tube 32 and the valve body 42 and is provided with an extension portion 49 which is molded about the tube 48.

The valve body 42 is provided with an elongated bore 50 which is counterbored at 54 to define an annular radial portion between the bores 50 and 54 forming a valve seat 52. The valve body 42 is provided with an inlet passage 56 providing communication between the inlet port 46 and the inlet chamber formed by bore 54 beneath the valve seat 52. The valve body 42 is also provided with an outlet passage 58 providing communication from the downstream side of the valve seat 52 to the outlet port 44.

Within the bore 50 there is provided a one-piece valve member 60 which functions as a combined valve head, valve stem and valve seal supporting means. This member 60 includes an upper stem portion in threaded engagement with a threaded portion of the upper end of the bore 50. At its lower end this integral member 60 is provided with a valve head in the form of a cylindrical, reduced diameter portion 62, the lower surface of which is cooperable with the valve seat 52 to perform the flow controlling function. Between the threaded stem portion and the valve head portion 62 the member 60 is provided with a cylindrical portion 70 of intermediate diameter which has an annular recess 72 formed therein. An O-ring sealing member 74 is held within this annular recess 72 so that the O-ring 74 serves to provide an effective seal between the member 60 and the bore 50 in the valve body 42.

It will be apparent that the passage 58 is arranged to communicate with the bore 50 at a location between the valve seat 52 and the O-ring sealing means 74.

At its upper end, the member 60 extends through an opening 78 in the cover 34 and is provided with a knob 80 which is also formed as an integral part of the member 60. The knob 80, of course, serves to cause rotation of the member 60 to achieve the gas flow controlling function. In other words, rotation of the knob 80, which of course causes rotation of the member 60, serves to move the valve head portion 62 toward or away from the valve seat 52 to achieve flow control of the shielding gas as it passes from the tube 48 to the tube 32 by way of the control valve in accordance with the invention.

It will be apparent that the construction of the control valve in accordance with the invention achieves many advantages. In the first place, the construction provides a very economical arrangement involving a minimum of parts by reason of the particular construction in which the member 60 provides the combined functions of a valve stem, a valve head, a seal supporting means, and a valve actuating knob. Moreover, by reason of this simple construction valve difficulties should practically be eliminated since the problems of wear and the maintaining of proper cooperation of various valve elements is essentially eliminated.

It is to be understood that the above description is illustrative and it will be apparent that various changes may be made in the construction and arrangement of parts without departing from the scope of the invention. Accordingly, it is not desired to be limited except as required by the following claims.

What is claimed is:

1. In a welding torch comprising a handle, a torch head mounted on said handle, and means carried by said handle for delivering shielding gas to said torch head, said shielding gas delivering means comprising a flow control valve for controlling the flow of gas to said torch head, the improvement which comprises in combination:

a valve body having an inlet and an outlet, an elongated first bore formed in said valve body;

a counterbore formed in said valve body axially adjacent said first bore and having a smaller diameter than said first bore;

a valve seat intersecting said bores;

an inlet passage providing communication between said inlet and said counterbore;

an outlet passage providing communication between said outlet and said first bore;

said first bore having a threaded portion spaced from said valve seat;

a one-piece valve head, valve stem, and valve seal supporting member comprising a generally cylindrical portion having a valve head formed at one end, a threaded portion to be received by the threaded portion of said first bore, an annular recess positioned between said valve head and said threaded portion; and O-ring sealing means disposed in said annular recess so that the sealing means is a movable packing between said one-piece member and the wall of said first bore.

2. A welding torch according to claim 1 wherein said valve seat comprises a flat annular wall portion and said valve head comprises a cylindrical portion having a flat end, the flat end of said valve head being cooperable with said flat valve seat for controlling the flow of gas through said valve body.

References Cited

UNITED STATES PATENTS

| | | | |
|---|---|---|---|
| 2,310,164 | 2/1943 | Prendergast et al. | 219—75 |
| 3,238,350 | 3/1966 | Klasson et al. | 219—75 |
| 3,250,889 | 5/1966 | Himmelman | 219—75 |
| 3,263,055 | 7/1966 | Broderick et al. | 219—75 |
| 3,413,436 | 11/1968 | Tallman | 219—75 |

W. DEXTER BROOKS, Primary Examiner